June 11, 1935.   R. B. WATSON   2,004,641
FOUNTAIN PEN
Filed Aug. 23, 1934
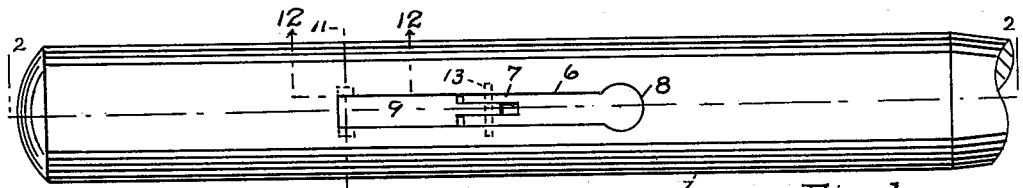
Fig. 1
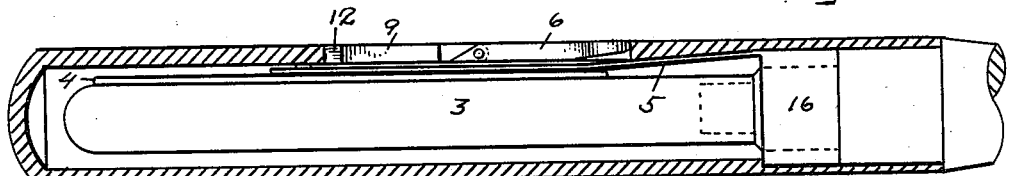
Fig. 2
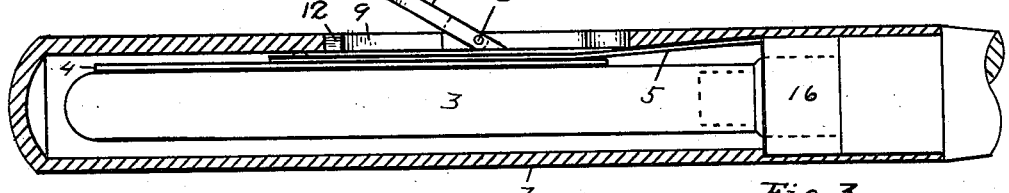
Fig. 3
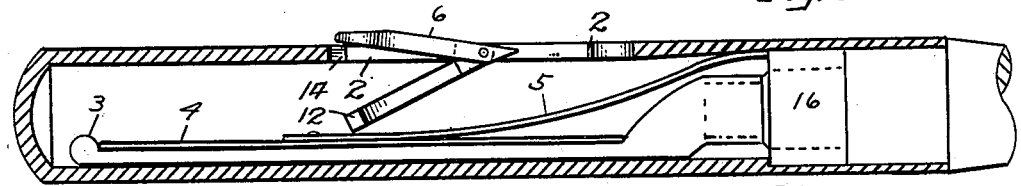
Fig. 4
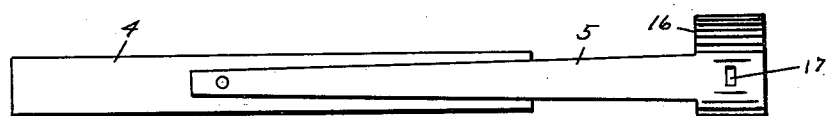
Fig. 5
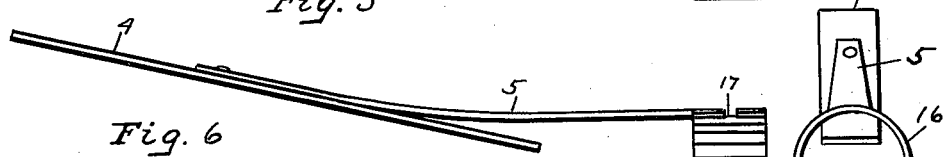
Fig. 6
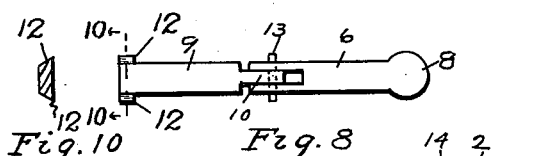
Fig. 7
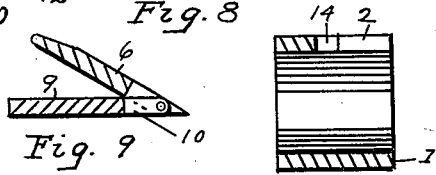
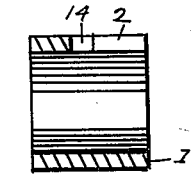
INVENTOR
Roger B Watson Patented June 11, 1935

2,004,641

UNITED STATES PATENT OFFICE 2,004,641

FOUNTAIN PEN

Roger Blomley Watson, Colorado Springs, Colo.

Application August 23, 1934, Serial No. 741,129

4 Claims. (Cl. 120—46)

My invention relates to fountain pens in general and to filling devices therefor, specifically.

My object is to provide a deflating device which deflates by an inward pressure on the main operating lever, instead of by an outward pull, so that the ink reservoir can be deflated and filled by the operation of a thumb and finger of one hand of the user, leaving the other hand free to hold an ink bottle and to tip said bottle, if necessary.

Figure 1 represents a plan view of the barrel, showing my operating levers disposed in the rest position in the longitudinal slot; Fig. 2, a longitudinal cross section on the line 2—2 in Fig. 1; Fig. 3, a longitudinal cross section on the line 2—2 in Fig. 1, showing the operating lever 6 in operative position; Fig. 4, a longitudinal cross section on the line 2—2 in Fig. 1, showing my device in operating position; Fig. 5, a plan view of the spring-controlled pressure bar; Fig. 6, a side view of Fig. 5; Fig. 7, an end view of Fig. 6; Fig. 8, a plan view of the operating levers in the rest position; Fig. 9, a side view, partly in section, showing the operating levers in the operative position; Fig. 10, a sectional view on the line 10—10 in Fig. 8; Fig. 11, a cross sectional view of the barrel on the line 11—11 in Fig. 1; and Fig. 12, a cross sectional view of the barrel on the line 12—12 in Fig. 1.

Although I show the preferred embodiment of my invention, I do not thereby limit myself to the precise form shown but wish it understood that within the scope of what hereinafter is claimed, various changes in the details of construction may be made without departing from the spirit of the invention.

My device comprises a main operating lever 6 provided with a pair of longitudinal projections 7 and a finger piece 8; and an auxiliary operating lever 9 provided with lugs 12 and a longitudinal central projecting portion 10. The main operating lever 6 and lever 9 are normally disposed in the slot 2, the central projecting portion 10 of lever 9 being disposed between the longitudinal projections 7 of lever 6. A pin 13 passes through the longitudinal projections 7 of lever 6 and the central projecting portion 10 of lever 9 and extends into the adjacent parts of the barrel, so as to secure said levers in said barrel.

The character 1 denotes a fountain pen barrel having a longitudinal slot 2; 3, a collapsible ink reservoir; 4, a pressure bar secured to one end of a spring 5. A split ferrule is provided at the other end of spring 5. The spring 5 is attached by a rivet or solder to the pressure bar 4. The other end of the spring is provided with a split ferrule 16 by which it is secured in the pen barrel. The ferrule is a little larger than the part of the barrel into which it fits so that it will spring firmly into place when inserted. This part of the pen barrel is the same size as the part provided for the pen section, and slightly larger than the main bore. A perforation 17 is provided in ferrule 16 so that a hook may be used to insert or withdraw it from the barrel.

The spring 5 normally presses against lever 6 and holds it longitudinally in slot 2, the lugs 12 of lever 9 resting in the recesses 14 on the inside of slot 2 shown in Fig. 12, to prevent lever 9 from opening outward. The pivoted end of lever 6 projects a little beyond the pivot 13 forming an arm against which the spring 5 presses and prevents lever 6 from opening outward when not in use. The spring should have an upward curve when out of the barrel, as shown in Fig. 6, so that it will hold the pressure bar firmly away from the ink reservoir, and it should be thin and flexible, especially towards the riveted end.

To operate my device, lever 6 is lifted up and folded over against lever 9 as shown in Figs. 3 and 9. Lever 6 does not act on lever 9 until placed in this position and the angle at which lever 6 begins to act on lever 9 is determined by the length of the longitudinal projections 7 on lever 6 and of the central projection 10 on lever 9. The barrel is now taken between the thumb and finger of one hand and lever 6 is pressed inward towards the ink reservoir, forcing pressure bar 4 against the ink container and thus expelling the air. Upon releasing the pressure on lever 6, the spring 5 pushes the levers, spring and pressure bar up and away from the ink reservoir which thereby expands and draws in the ink.

The distinguishing feature of my device is that it is operated by an inward pressure upon the main filling lever instead of by an outward pull, making it easy to operate with one hand. Also that in the deflating operation all parts of the mechanism move inward towards the ink reservoir.

Having thus described my invention, what I claim as new and desire to secure by Letters Patent is:

1. In a fountain pen, the combination of a barrel having a longitudinal slot; a sac pressure bar within said barrel; a main operating lever having a pair of longitudinal projections; an auxiliary operating lever having lugs and a central projection adapted to fit in between the longitudinal projections of the main operating lever;

a pin passing through said longitudinal projections and central projecting portions and into the adjacent sides of said slot; said main operating lever being adapted to be operated by an inward pressure upon its free end.

2. In a fountain pen, the combination of a barrel having a longitudinal slot; a collapsible ink reservoir within said barrel; a spring-controlled pressure bar disposed adjacent to said ink reservoir; a main operating lever normally disposed longitudinally within said slot and provided with a pair of longitudinal projections; an auxiliary operating lever normally disposed longitudinally within said slot and provided with lugs and with a central projecting portion disposed between said longitudinal projections of said main operating lever; a pin passing through said longitudinal projections and central projecting portion and into the adjacent sides of said slot.

3. In a fountain pen, the combination of a barrel having a longitudinal slot; a sac pressure bar within said barrel; a main operating lever and an auxiliary operating lever concentrically pivoted in said slot and normally disposed longitudinally in said slot; said main operating lever being adapted to be operated by an inward pressure upon its free end.

4. In a fountain pen, the combination of a barrel having a longitudinal slot; a sac pressure bar within said barrel; a main operating lever having a pair of longitudinal projections, normally disposed longitudinally in said slot; an auxiliary operating lever, having a central projection, normally disposed longitudinally in said slot, the central projection being disposed between the longitudinal projections of said main operating lever; and a pin passing through said longitudinal projections and said central projection and into the adjacent sides of said slot; said levers being adapted to be operated by an inward pressure upon the free end of said main operating lever.

ROGER BLOMLEY WATSON.